(12) United States Patent
Crowther

(10) Patent No.: US 10,690,487 B2
(45) Date of Patent: *Jun. 23, 2020

(54) PROFILE INSPECTION SYSTEM FOR THREADED AND AXIAL COMPONENTS

(75) Inventor: David Crowther, Bloomfield Township, MI (US)

(73) Assignee: GII Acquisition LLC, Davisburg, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/571,836

(22) Filed: Oct. 1, 2009

(65) Prior Publication Data

US 2010/0039655 A1 Feb. 18, 2010

Related U.S. Application Data

(63) Continuation of application No. 11/510,402, filed on Aug. 25, 2006, now Pat. No. 7,684,054.

(51) Int. Cl.
*G01B 11/22* (2006.01)
*G01B 11/24* (2006.01)

(52) U.S. Cl.
CPC ...... *G01B 11/2425* (2013.01); *G01B 11/2433* (2013.01); *G05B 2219/37212* (2013.01)

(58) Field of Classification Search
CPC ...... G05B 2219/37212; G01B 11/2425; G01B 11/2433

(Continued)

(56) References Cited

U.S. PATENT DOCUMENTS 3,924,953 A 12/1975 Allard
4,315,688 A 2/1982 Pryor (Continued)

FOREIGN PATENT DOCUMENTS

WO 2005022076 A2 3/2005

OTHER PUBLICATIONS

International Search Report and Written Opinion dated Oct. 22, 2008 for the corresponding PCT Serial No. PCT/US08/072944 filed Aug. 13, 2008.
Preliminary Amendment; filed May 5, 2016 in U.S. Appl. No. 14/697,760. (9 pages).

* cited by examiner

*Primary Examiner* — Rebecca C Bryant
(74) *Attorney, Agent, or Firm* — Brooks Kushman P.C.

(57) ABSTRACT

A system and method are disclosed for inspecting a component having a length, a width, and an axis. The system includes a fixture for holding the component, a light source disposed on one side of the component, and an optical detector disposed on the other side of the component. In the preferred embodiment, the detector has a field of view wider than the width of the component, thereby enabling the detector to image a portion of the outer edges of the component. A translation stage is operative to move the light source and detector in unison along the length of the component and a processor, in communication with the detector and the translation stage, is operative to: a) receive electrical signals representative of the outer profile imaged by the detector; b) move the translation stage incrementally along the length of the component; and c) record the outer profile imaged by the detector at each increment and form a composite profile of the component. In the preferred embodiment, the processor is further operative to record the composite profile of the component at one or more angular orientations by rotating the component through a predetermined angle about its axis.

48 Claims, 2 Drawing Sheets

(58) Field of Classification Search
USPC ....... 356/606–608, 231.1, 237.2, 237.3, 625,
356/628, 629, 634, 635, 638–640
See application file for complete search history.

(56) References Cited

U.S. PATENT DOCUMENTS

| | | | |
|---|---|---|---|
| 4,532,723 A | 8/1985 | Kellie et al. | |
| 4,598,998 A * | 7/1986 | Kamei | G01B 11/2425 |
| | | | 356/237.5 |
| 4,644,394 A | 2/1987 | Reeves | |
| 4,721,388 A | 1/1988 | Takagi et al. | |
| 4,831,251 A | 5/1989 | Hanna | |
| 4,852,983 A | 8/1989 | Fein | |
| 4,906,098 A | 3/1990 | Thomas et al. | |
| 4,969,746 A | 11/1990 | McConnell et al. | |
| 4,983,043 A | 1/1991 | Harding | |
| 5,012,117 A | 4/1991 | Karafa et al. | |
| 5,164,995 A | 11/1992 | Brooks et al. | |
| 5,168,458 A | 12/1992 | Gomes | |
| 5,170,306 A | 12/1992 | Gomes | |
| 5,291,272 A | 3/1994 | Demirsu | |
| 5,383,021 A | 1/1995 | Hanna | |
| 5,521,707 A | 5/1996 | Castore et al. | |
| 5,568,263 A | 10/1996 | Hanna | |
| 5,608,530 A | 3/1997 | Gates | |
| 5,646,724 A | 7/1997 | Hershline | |
| 5,986,745 A | 11/1999 | Hermary et al. | |
| 6,044,170 A | 3/2000 | Migdal et al. | |
| 6,055,329 A | 4/2000 | Mufti | |
| 6,252,661 B1 | 6/2001 | Hanna | |
| 6,285,031 B1 | 9/2001 | Listi et al. | |
| 6,313,948 B1 | 11/2001 | Hanna | |
| 6,959,108 B1 | 10/2005 | Bartelt et al. | |
| 2005/0174567 A1 | 8/2005 | Hanna | |
| 2006/0236792 A1 | 10/2006 | Hanna | |

PROFILE INSPECTION SYSTEM FOR THREADED AND AXIAL COMPONENTS

CROSS-REFERENCE TO RELATED APPLICATIONS

This application is a continuation of U.S. application Ser. No. 11/510,402, which was filed on Aug. 25, 2006 and issued as U.S. Pat. No. 7,684,054 on Mar. 23, 2010.

FIELD OF THE INVENTION

This invention relates generally to component inspection and, in particular, to a system and method for inspecting the profile of threaded and cylindrical components.

BACKGROUND OF THE INVENTION

There is a need in many industries for the measurement of thread characteristics on screws, bolts and other fasteners and components. Apparatus for this purpose may be broadly categorized into contact and non-contact approaches. Contact-type gages typically employ feelers which contact the threaded surface to be measured at set points and mechanically measure the tolerances. One disadvantage of such devices is that the contact feelers can become worn with usage or become out of adjustment. Also, because the gage only takes a reading when the feeler is contacting the component, 100% coverage of the threaded surface during the inspection is not possible.

Numerous non-contact thread measurement techniques have been developed, including systems that employ lasers and video cameras. U.S. Pat. No. 4,315,688 shows an apparatus for inspecting threaded objects, such as bolts, moving on a conveyor line past the inspection station. A light-sensitive detector picks up reflected light and produces an analog output which is used to determine the quality of the threads. The light-sensitive area of the detector is sufficiently small to resolve the individual threads of the threaded object, to determine whether the correct number of threads are present.

U.S. Pat. No. 4,598,998 discloses a screw surface flaw inspection method and an apparatus therefore. The system projects light onto the surface of a screw, the light being scanned axially of the screw. A detector picks up the reflected light from the projected surface and sends an output signal to a signal processing circuit to thereby detect the flaw on a basis of time base variation of the intensity of reflected light. The method and apparatus enables the inspection of minute flaws rapidly and exactly.

The apparatus of U.S. Pat. No. 4,644,394 has a light source for illuminating the threaded surface to be inspected, a mirror system for directing the light from the light source, and a video camera for receiving the directed light, for forming an optical image of the illuminated threaded surface, and for converting the optical image into electrical video signals. An encoding means converts the video signals from the camera into digital information representative of special information in the optical images viewed by the video camera. Processing means receive and interpret the digitized information provided by the encoding means for analyzing the thread characteristics and for detecting defects in the threaded surface being inspected.

An apparatus for measuring the profile of portions of an article located within a predefined plane is disclosed in U.S. Pat. No. 4,906,098. Each portion is scanned, such as by an optical micrometer providing a beam of radiant energy, to determine its dimension. The distance between each portion and a vertical reference is also scanned to determine its dimension. The article is rotated about an axis intersecting the predefined plane within the scan of the beam and is axially moved along an axis parallel to the intersecting axis within the scan of the beam so that the dimension of each portion and its distance from the vertical reference can be determined. The apparatus may be used in combination with a cavity identification system to control manufacturing employing multiple molds.

U.S. Pat. No. 5,521,707 uses laser triangulation to quickly build a precise profile of a thread form. The sensor is mounted on a precision mechanical system that moves the sensor to scan the thread form, producing a set of digitized images of a thread form that are digitally stored. The digitized images are analyzed to derive quantitative information about thread characteristics such as pitch, lead, root radius, flank angle, surface roughness, helix variation, and pitch diameter. Thread characteristics may be stored and later retrieved in order to provide traceability and verification of the part.

U.S. Pat. No. 5,608,530 utilizes a laser for producing a beam of radiation which is then refined in cross section through use of plano-cylindrical lenses. The refined beam of radiation falls incident on a part to be measured. The unobstructed portions of the beam are then redirected by a pair of reflective surfaces producing non-parallel radiating beams; each beam comprises of the unobstructed portion of radiation which has passed radially opposed halves of the part. The magnitude of radiation present in each non-parallel radiating beam is then measured. The magnitude of radiation measured is proportional to a dimensional measurement. However, the assumption must be made that the part is placed perfectly in the center relative to lens; if not, diameter measurement may be problematic. In addition, since the resolution limit is a strong function of laser wavelength, performance may suffer if component layout is not properly aligned. For example, if the light from the laser varies, this will result in a change at the detectors which, in turn, could be misinterpreted as a diameter irregularity.

Thus, despite the advances of these and other approaches, the need remains for simple yet effective inspection apparatus and method.

SUMMARY OF THE INVENTION

This invention resides a system and method for inspecting a component having a length, a width, and an axis. According to an apparatus aspect, the system includes a fixture for holding the component, a light source disposed on one side of the component, and an optical detector disposed on the other side of the component. In the preferred embodiment, the detector has a field of view wider than the width of the component, thereby enabling the detector to image a portion of the outer edges of the component. A translation stage is operative to move the light source and detector in unison along the length of the component and a processor, in communication with the detector and the translation stage, is operative to:

a) receive electrical signals representative of the outer profile imaged by the detector, b) move the translation stage incrementally along the length of the component, and c) record the outer profile imaged by the detector at each increment and form a composite profile of the component.

The light source and optical detector and generally linear and spaced apart from one another in a generally parallel relationship. The optical detector may be a line scanned or may form part of a two-dimensional image detector. The light source preferably has a width co-extensive with the width of the optical detector.

In the preferred embodiment, the processor is further operative to record the composite profile of the component at one or more angular orientations by rotating the component through a predetermined angle about its axis. Using the composite profile of the component at one or more angular orientations, the processor may generate a three-dimensional model the component by assembling the composite profiles of the component taken at a plurality of angular orientations.

The preferred apparatus includes a display device, and the processor is further operative to generate a display of the profile of the component. The fixture holds the component in a generally vertical orientation, and the light source and optical detector are horizontally disposed. In a comprehensive embodiment, the processor is further operative to generate a virtual object that interacts with the composite profile and calculate parameters associated with the component as a function of the interaction. For example, if the composite profile includes a thread pattern, the processor may perform a 3-wire analysis or other investigations.

DETAILED DESCRIPTION OF THE INVENTION

Figure 1:
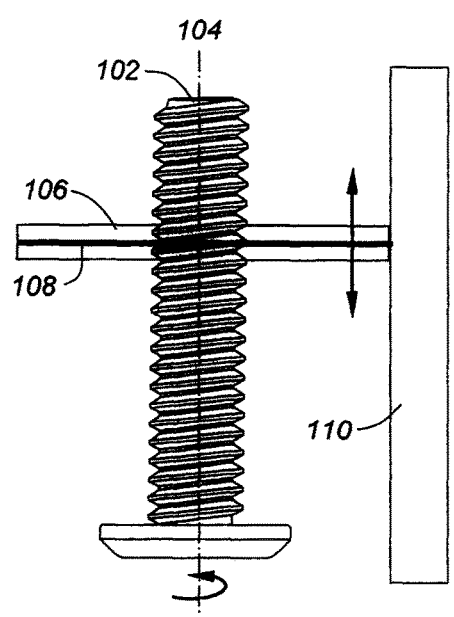
FIG. 1 is a simplified drawing used to illustrate the way in which this invention operates.

FIG. 1 is a drawing which illustrates the preferred embodiment of the invention. A part 102 to be inspected is placed in a fixture (discussed later) allowing the component to be rotated about axis 104. Behind the component 102 is a bright, horizontally oriented light source 106 and, in front of the component 102 is a horizontally oriented light detector 108. It must be kept in mind that this is a highly simplified drawing, such that details of the light source, detector and other features are not illustrated for the purposes of clarity. Nor are any of the enclosures that would be used for most of the components.

The light source 106 and detector 108 are physically coupled to one another, such that they move as a unit up and down along the axis of the part 104. This is accomplished by connecting the light source and detector to a column 110, including a translation mechanism and linear encoder for precise movement. In the preferred embodiment, the light source and detector move in fixed increments of 1 micron, though this is adjustable.

The light source 106 is of a high intensity, creating a bright field and an image on the detector 108 which is extremely high in contrast. With such an arrangement, that the light-sensing elements of detector 108 essentially see white where the light is able to pass by the component 102, and dark or black where the component blocks the light reaching detector. The elements of the detector 108 are coupled to a processor (not shown) which receives the profile information for each up/down increment of the light source and detector as it moves. The various readings are compiled, providing for an accurate profile of the component at a particular orientation. Once the length of the component is scanned as desired or necessary, the component is rotated about axis 104, and the process is repeated. The angle through which the component is rotated is preferably user controllable, though a total rotation of 180.degree. as opposed to 360.degree. is sufficient, since the detector need not look at the "backside" of the component.

According to the invention, the detector 108 is comprised of a linear set of sensor elements, each element being positioned at a known, fixed distance relative to the overall set. As these dimensions are known, the profile and other characteristics of the component 102, including diameter and other features, may be precisely measured and stored through appropriate calibration. Although the detector 108 may be implemented utilizing a line-scan camera, these are currently quite expensive. Consequently, according to the invention, a line-scan camera is simulated using a two-dimensional image sensor, which is very reasonably priced due to its numerous applications in digital cameras and other equipment.

Since the detector elements of most two-dimensional image sensors are grouped in a plurality of lines, a number of rows of pixels are used during each up/down increment. For example, if 16 lines are coupled to one another in the image sensor, the stage 110 is directed under computer control to move up or down at a distance calibrated to the 16 lines of the sensor. Again, since the distance between rows of pixels on the image sensor is known in advance, it is a straightforward calibration procedure to increment the light source 106 and detector 108 by any given number of rows per increment. Note, further, that the invention is not limited in terms of the length of the part, so long as it fits into the machine and the translator 110 is able to move the light source 106 and detector 108 along the length of the part.

Given the versatility of the system and method, the scanning process may utilize multiple, distinct scanning processes. For example, in addition to the linear scan just described (set angle, variable position along the part axis), a rotational scan may be used with a set linear position and a variable angle. The rotational scan can, for example, be used very efficiently to detect the flat-to-flat or peak-to-peak distance on a hex screw head. This can be used for any local analysis requiring significantly more data than the ones given by the somewhat limited number of planes available through the linear scan. Checking for roundness for instance would require at least 4 planes which the user may not necessarily want for the rest of the inspection. Use of the rotational scan allows for the acquisition of more data to perform a roundness analysis.

These different scan modalities may be used separately, together, and/or repeated as desired. For example, a complete scan process (linear+rotational) may be repeated several times, (i.e., "observations"), which may be important for six-sigma type quality control process.

Figure 2A:
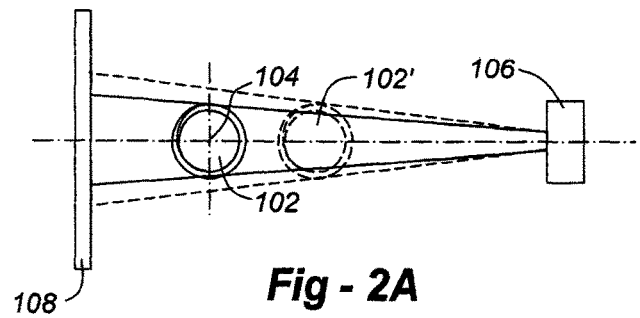
FIG. 2A shows how, if a light source is a point source, or has a horizontal dimension less than that of the detector elements used in the image sensor, the features of the component and the diameter may be misinterpreted.
Figure 2B:
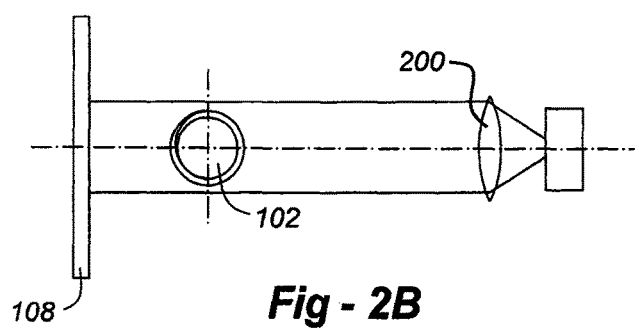
FIG. 2B illustrates how a lens may be used to collimate a divergent beam.
Figure 2C:
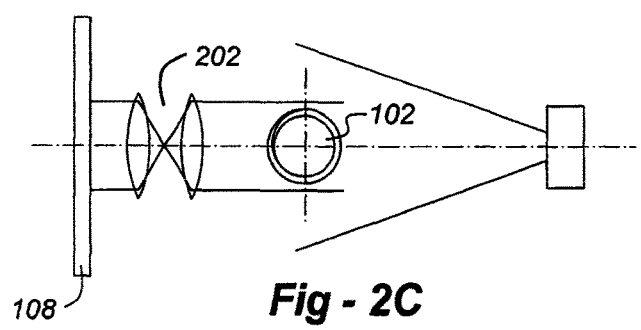
FIG. 2C shows how a telecentric lens arrangement may be used between an image sensor and a component under inspection to provide a consistent profile of the part regardless of the light source structure.

Since it is important for the pixel elements of the detector 108 to receive an accurate representation of the right and left profiles of the component 102, the structure of the light source is important to the invention. As shown in FIG. 2A, if light source 106 is a point source, or has the horizontal dimension less than that of the detector elements used in the image sensor 108, the features of the component and the diameter will be misinterpreted as larger if the component 102 is moved from axially position 104 toward the light source to a position 102'. Various options are available according to the invention to correct this deficiency. As shown in FIG. 2B, if the light source is divergent, a lens 200 may be used to collimate the beam. Alternatively, as shown in FIG. 2C, a telecentric lens arrangement 202 may be used between the image sensor 108 and the component 102, such that the image sensor of "C" is a consistent profile of the part regardless of the light source structure.

Figure 2D:
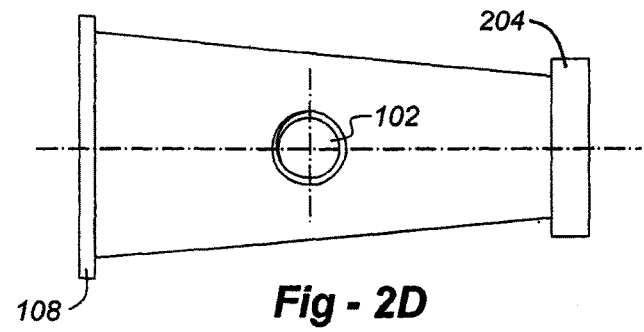
FIG. 2D shows a light source obtained via a line-generating laser.

In the preferred embodiment, however, the arrangement of FIG. 2D is used, wherein the width of the light source 204 is physically matched to the detector elements 108. This is done with a light source formed from a linear row of surface-mount high-brightness-emitting diodes, with an overall length on the order of 2 inches. The width of the rows of pixels on the image sensor are also on the order of 2 inches, such that, in essence, a plane of light emerges from the light source, past the component, and on to the image sensor.

A light source in the form of a line of LEDs (FIG. 2D) has advantages and disadvantages. LEDs are relatively inexpensive, compact and easy to implement, but the light is not collimated. This mean that the outer edges LEDs can create reflections on the part if it shiny or if it has a succession of flat surfaces such as a hex screw head. This problem may be resolved by implementing a line-generated laser lighting scheme (collimated in nature), but is bulkier and more expensive. A prudent approach is to offer the LED lighting with the current "low-res" 2D camera and standard (non-telecentric) optics for the entry level operation, and collimated lighting, telecentric optical mode, and "hi-res" lines-can for a higher-performance operation.

An advantage of the invention is that the component need not be perfectly centered in the inspection plane in order to measure features, such as threads, diameter, and so forth. Since the light source and detector are laterally fixed as they move up or down, the profile of the part may be registered to one end of the detector, measurements being normalized regardless of minor variances. This is an advantage over some prior art systems, which must be placed exactly in the center of a beam in order for multiple detectors to accurately measure component features. The current invention not only measures the width of the part in the area of inspection but also its location in the field of view with respect to one end of the detector. Thus, the invention may measure the features on components that would be a challenge to existing systems, including screws of the type called "trilobes." These are self-tapping screws that are not, at all times, perfectly cylindrical. According to the instant invention, however, since measurements are referenced to one end of the detector, accurate details may be determined following a sufficient number of angular displacements. For instance the trilobular feature is only detected by the oscillation of its edges versus the angular displacement, while displaying a constant width. The invention can also utilize exotic parts, having diameters that change dramatically from end to another. Components that are bent and which may include flat surfaces may also be examined. A distinct advantage of the physical measurement process described here is that it directly measures a length (or diameter) but also its horizontal location in the inspection plane. This is particularly important in the case of the trilobular parts since at any given angle the diameters are equal. The only tell-tell sign of its trilobular feature is its horizontal "wobble," which this invention takes into account.

Figure 3A:
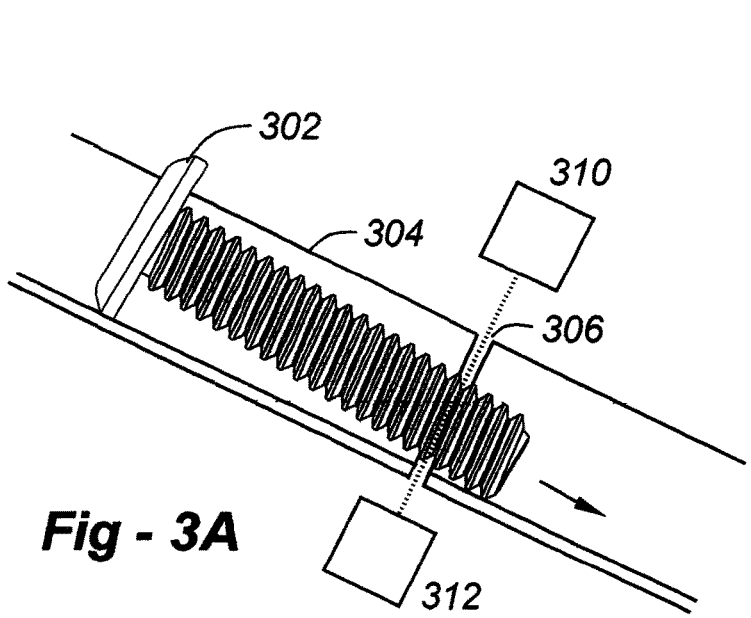
FIG. 3A depicts a component moving down a V-shaped track having a separation allowing a light source and detector to be positioned to scan the part as it moves along the track.
Figure 3B:
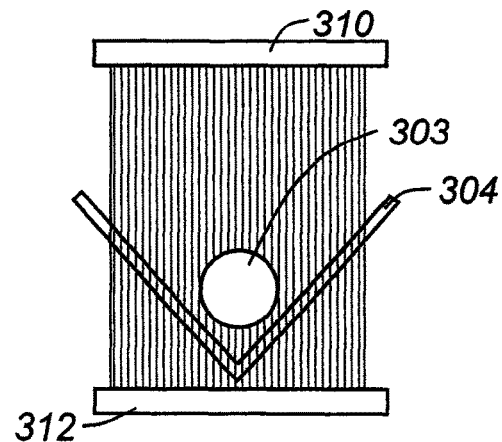
FIG. 3B is an end-on view of the profile 303 of the component 302 seen as the part moves.

The invention is also applicable to both 100% inspection and sorting operations. Reference is made to FIGS. 3A and 3B which show, respectively, a component 302 moving down a V-shaped track 304 having a separation 306, allowing a light source and detector 310, 312, to be positioned to scan the part as it moves along the track. FIG. 3B is an end-on view of the profile 303 of the component 302 seen as the part moves. The velocity of the component can be measured optically. Although the gap in the track may cause the part to move or vibrate, a continuous track which is light-permeable may be used according to the invention.

Figure 4:
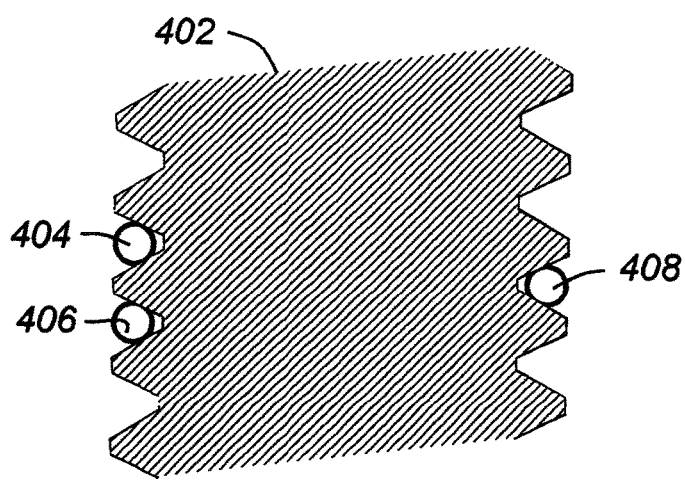
FIG. 4 shows how it is possible with the invention to perform virtual a 3-wire thread analysis.

With the invention it is also possible to perform a virtual 3-wire thread measurement. Traditionally this is done by mounting a component in a fixture the, using 3 feelers coupled to micrometers, thread pitch and other parameters may be determined when the feelers are nested in the thread grooves. As shown in FIG. 4, this test may be simulated with the invention using computer-generated wires of an appropriate diameter. The component is indicated at 402, and three virtual wires 404, 406 and 408 are shown in within threads, in the way that an existing contact-type measurement is made.

Also according to the invention if sufficient profiles are taken along an adequate number of angular rotations, interpolation or other forms of "morphing" algorithms may be used to estimate component geometry in between the actually measured profiles, thereby allowing a three-dimensional model of the part to be created. With this data, the use of a computer aided design program may be used to view a component from different angles, rotate, flip, magnify and perform other operations on the part seen on a computer screen. Furthermore, the 3D reconstruction of the part can be used to reverse engineer parts. Also the inspected part 3D model can be compared to the 3D design model and geometric and dimensional differences can be highlighted using a color scale proportional to the dimensional difference.

Figure 5:
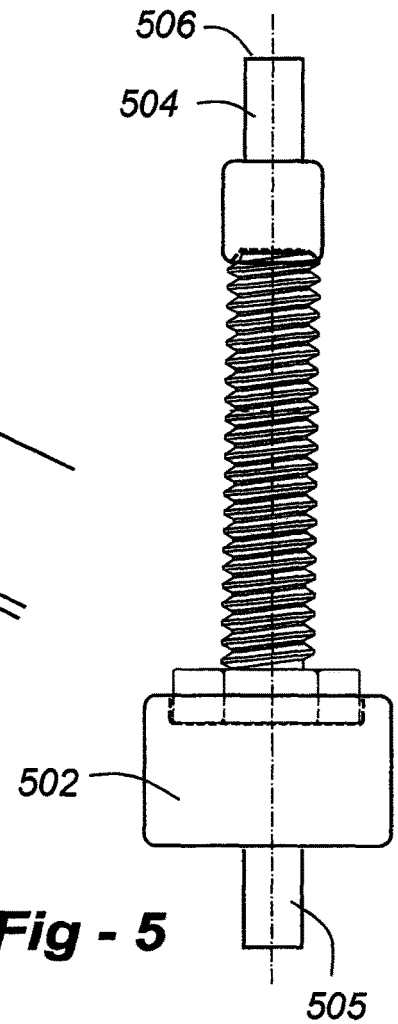
FIG. 5 is a drawing of a chuck components according to the invention used to hold components for rotational purposes.

Referring now to FIG. 5, there are shown preferred chucks 502, 504 according to the invention used to hold components for rotational purposes. Assuming the part is a bolt with a hex head, lower chuck 502, removably attached to shaft 505, includes a hex-shaped well into which the head of the bolt fits. Similarly, upper chuck 504 is adapted to receive the other end of the part. The component-contacting ends may be spring-loaded, allowing a part to be easily and quickly snapped into position. Even if a user requires custom adapters for particular part geometries, these are easily machined and relatively inexpensive.

What is claimed is:

1. A profile inspection system for a threaded fastener having a length, a width, and an axis defined as being central to the fastener and upper and lower end surfaces and side surfaces angularly spaced about the axis, the system comprising:
   a rotatable fixture including upper and lower members to hold the fastener in a generally vertical orientation at its upper and lower end surfaces, respectively, and to rotate the held fastener through an angular range about its central axis, wherein the fixture is capable of allowing the side surfaces of the fastener to be scanned along the length of the fastener between the upper and lower members during a linear scan;
   a light source supported on a linear translator on one side of the fixture capable of projecting a plane of light having a width wider than the width of the fastener onto the held fastener to obtain left and right portions of the plane of light passing by and not blocked by the held, fastener wherein the axis is substantially perpendicular to the plane of light;
   a camera supported on the linear translator on a second side opposite the one side of the fixture, the camera having a field of view wider than the width of the fastener to detect the left and right portions, thereby enabling the camera to image left and right portions of the outer edges of the fastener at a plurality of angular orientations of the held fastener and provide corresponding electrical signals; and
   at least one processor coupled to the camera and operative to perform the following functions:
      a) receive the electrical signals representative of left and right outer profiles imaged by camera during the linear scan and during a rotational scan,
      b) control the rotational and linear scans,
      c) record the left and right outer profiles imaged by the camera based on the electrical signals, the recorded left and right outer profiles representing composite profiles taken at the plurality of angular orientations wherein the side surfaces of the held fastener which extend completely around the fastener between the upper and lower members are inspected without a need to detect a portion of the plane of light blocked by the fastener,
      d) assemble the composite profiles of the fastener taken at the plurality of angular orientations,
      e) generate a virtual object that interacts with the composite profiles, and
      f) calculate a thread pitch of the fastener as a function of the interaction between the virtual object and the assembled composite profiles;
   wherein the linear translator is fixed to translate along a fixed one-dimensional linear path, wherein the light source and the camera are supported on the linear translator with a fixed distance therebetween such that the light source and the camera are moved along the fixed one-dimensional linear path in unison along the length of the fastener during the linear scan while maintaining the fixed distance therebetween, and wherein rotation of the fastener and fixed one-dimensional movement of the linear translator enables the fastener to be scanned during the scanning process.

2. The inspection system of claim 1, wherein the light source and camera are generally linear and spaced apart from one another in a generally parallel relationship.

3. The inspection system of claim 1, wherein the light source has a width co-extensive with the width of the camera.

4. The inspection system of claim 1, wherein the processor is further operative to generate a display of the outer profiles of the fastener.

5. The inspection system of claim 1, wherein the light source and camera are generally horizontal.

6. The inspection system of claim 1, wherein the processor is further operative to:
   generate a virtual object that interacts with the composite profiles; and
   calculate parameters associated with the fastener as a function of the interaction.

7. The inspection system of claim 1, wherein the composite profiles include a thread pattern.

8. The inspection system of claim 1, wherein the processor is operative to record both the outer profiles and the distance from a fixed position to one edge of one of the outer profiles.

9. A profile inspection system for a threaded fastener having a length, a width, and an axis defined as being central to the fastener and upper and lower end surfaces and side surfaces angularly spaced about the axis, the system comprising:
   a rotatable fixture including upper and lower members to hold the fastener in a generally vertical orientation at its upper and lower end surfaces, respectively, and rotate the held fastener through an angular range about its central axis, wherein the fixture is capable of allowing the side surfaces of the fastener to be scanned along the entire length of the fastener between the upper and lower members during a linear scan;
   an LED light source supported on a linear translator on one side of the fixture capable of projecting a plane of light having a width greater than the width of the fastener onto the held fastener to obtain left and right portions of the projected plane of light passing by and not blocked by the held fastener wherein the axis is substantially perpendicular to the plane of light;
   a camera supported on the linear translator on a second side opposite the one side of the fixture, the camera having at least one row of pixel elements spaced apart at a known distance from one another and a field of view wider than the width of the fastener to detect the left and right portions, thereby enabling the camera to image left and right portions of the outer edges of the fastener at a plurality of angular orientations of the held fastener and provide corresponding electrical signals wherein distance moved during each increment of movement is calibrated to the at least one row of pixel elements wherein a given number of rows of pixel elements can be utilized to detect a line image during each increment; and
   a processor coupled to the camera and operative to perform the following functions:
      a) receive the electrical signals representative of left and right outer profiles imaged by the at least one row of pixel elements during each incremental movement during the linear scan and during a rotational scan,
      b) control the rotational and linear scans,
      c) store data relating to the electrical signals, the stored data representing composite profiles of the fastener taken at the plurality of angular orientations,
      d) assemble composite profiles of the fastener taken at the plurality of angular orientations, e) generate a virtual object that interacts with the composite profiles, and
f) calculate at least one geometric measurement of a thread of the fastener based on the interaction between the virtual object and the assembled profiles;

wherein the linear translator is fixed to translate along a fixed one-dimensional linear path, wherein the light source and the camera are supported on the linear translator with a fixed distance therebetween such that the light source and the camera are moved along the fixed one-dimensional linear path in unison along the length of the fastener during the linear scan while maintaining the fixed distance therebetween, and wherein the rotation of the fastener and fixed one-dimensional movement of the linear translator enables the fastener to be scanned during the scanning process.

10. The inspection system of claim 9, wherein the light source and camera are generally linear and spaced apart from one another in a generally parallel relationship.

11. The inspection system of claim 9, wherein the light source has a width co-extensive with the width of the camera.

12. The inspection system of claim 9, wherein the processor is further operative to generate a display of the outer profiles of the fastener.

13. The inspection system of claim 9, wherein the light source and camera are generally horizontal.

14. The inspection system of claim 9, wherein the composite profiles include a thread pattern.

15. The inspection system of claim 9, wherein the processor is operative to record both the outer profiles and the distance from a fixed position to one edge of one of the outer profiles.

16. A profile inspection system for an elongated, exteriorly threaded fastener having a length, a width, and an axis defined as being central to the fastener and parallel to its length, the fastener also having upper and lower end surfaces and side surfaces angularly spaced about the axis, the system comprising:
a rotatable fixture including upper and lower members to hold the fastener in a generally vertical orientation at its upper and lower end surfaces, respectively, and rotate the held fastener through an angular range about its central axis, wherein the fixture is capable of allowing the side surfaces of the held fastener to be scanned along the entire length of the held fastener between the upper and lower members during a linear scan;
an LIED light source supported on a linear translator on a first side of the fixture capable of projecting a plane of light having a width wider than the width of the fastener onto the held fastener to obtain loft and right portions of the projected plane of light passing by and not blocked by the held fastener wherein the axis is substantially perpendicular to the plane of light throughout the entire scanning process;
an optical detector including at least one row of pixel elements wherein distance moved during each increment of movement can be calibrated to the at least one row of pixel elements wherein a given number of rows of pixel elements is utilized to detect a line image during each increment, the detector being supported on the linear translator on a second side of the fixture opposite the first side of the fixture, the detector having a field of view in the form of an inspection plane wider than the width of the fastener to detect the left and right portions, thereby enabling the detector to image left and right portions of the outer edges of the held fastener at a plurality of angular orientations of the held fastener and to provide corresponding electrical signals representative of left and right outer profiles of the fastener imaged by the detector; and
at least one processor coupled to the at least one row of pixel elements, the processor:
controlling rotational and linear scans;
receiving the electrical signals during the rotational scan and during each incremental movement during the linear scan;
recording the left and right outer profiles imaged by the detector based on the electrical signals, the recorded left and right outer profiles representing composite profiles taken at the plurality of angular orientations including a thread pattern of the fastener wherein the side surfaces of the held fastener which extend completely around the fastener between the upper and lower members are inspected without a need to detect a portion of the plane of light blocked by the fastener;
assembling composite profiles of the fastener taken at the plurality of angular orientations;
generating a virtual object;
interacting the virtual object with the composite profiles; and
calculating at least one geometric measurement including thread pitch associated with threads of the fastener based on the interaction between the virtual object and the thread pattern of the assembled composite profiles;

wherein the linear translator is fixed to translate along a fixed one-dimensional linear path, wherein the light source and the camera are supported on the linear translator with a fixed distance therebetween such that the light source and the camera are moved along the fixed one-dimensional linear path in unison along the length of the fastener during the linear scan while maintaining the fixed distance therebetween, and wherein the rotation of the fastener and fixed one-dimensional movement of the linear translator enables the fastener to be scanned during the scanning process.

17. The system of claim 16, wherein the light source and the optical detector are generally linear and spaced apart from one another in a generally parallel relationship.

18. The system of claim 16, further comprising telecentric optics disposed between the light source and the optical detector to provide consistent profiles of the fastener.

19. The system of claim 16, wherein the processor generates a three-dimensional model of the fastener based on the assembled composite profiles.

20. The system of claim 16, wherein the processor generates a display of the profile of the fastener.

21. The system of claim 16, wherein the fastener has a head and wherein the lower member includes a rotatable chuck for fitting around the outside of the head.

22. The system as claimed in claim 16, wherein the held fastener does not move along its length during the linear scan.

23. The system as claimed in claim 16, wherein the optical detector includes a camera.

24. The system as claimed in claim 23, wherein the camera is a line-scan camera.

25. A method of inspecting the profile of an elongated, externally threaded fastener having a length, a width, and an axis defined as being central to the fastener and parallel to its length, the fastener also having upper and lower end surfaces and side surfaces angularly spaced about the axis, the method comprising:

holding the fastener in a generally vertical orientation at its upper and lower end surfaces and rotating the held fastener through an angular range about its axis;

projecting a plane of light from a light source onto viewable side surfaces of the held fastener and along the elongated dimension of the fastener between the upper and lower surfaces during a linear scan, the plane of light having a width wider than the width of the fastener to obtain left and right portions of the projected plane of light passing by and not blocked by the held fastener;

moving the plane of light in a direction parallel to the axis of the held fastener, wherein the axis is substantially perpendicular to the plane of light;

providing a camera with at least one row of pixel elements to detect the left and right portions of the projected plane of light to obtain detected line images of left and right portions of the outer edges of the held fastener at a plurality of angular orientations of the held fastener and to provide corresponding electrical signals representative of left and right outer profiles of the held fastener;

calibrating each incremental movement to the at least one row of pixel elements wherein a given number of rows of pixel elements is utilized to detect a line image during each movement;

receiving the electrical signals during each relative incremental movement along the length of the fastener during the linear scan;

receiving the electrical signals during rotary movement of the held fastener about the axis during a rotational scan;

recording the left and right outer profiles based on the electrical signals, the recorded left and right outer profiles representing composite profiles taken at the plurality of angular orientations including a thread pattern of the fastener wherein the viewable side surfaces of the fastener which extend completely around the fastener are inspected without a need to detect a portion of the plane of light blocked by the fastener;

assembling the composite profiles of the fastener taken at the plurality of angular orientations;

generating a virtual object;

interacting the virtual object with the composite profiles; and calculating at least one geometric measurement including thread pitch associated with threads of the fastener based on the interaction between the virtual object and the thread pattern of the assembled composite profiles;

wherein the light source and the camera have a fixed distance therebetween such that the light source and the camera are moved along a fixed one-dimensional linear path in unison along the length of the fastener during the linear scan while maintaining the fixed distance therebetween, and wherein the rotation of the fastener and fixed one-dimensional movement of the linear translator enables the fastener to be scanned during the scanning process.

26. The method of claim 25, further comprising generating a three-dimensional model of the fastener based on the assembled composite profiles.

27. The method of claim 25, further comprising generating a display of the left and right profiles of the fastener.

28. The method of claim 25, wherein the held fastener does not move along its length during the linear scan.

29. The method of claim 25, wherein the detecting is performed with a line scanned optical detector including a camera.

30. The method of claim 29, wherein the camera is a line-scan camera.

31. A method of inspecting the profile of an elongated threaded fastener having a length, a width, and an axis defined as being central to the fastener and parallel to its length, the fastener also having upper and lower end surfaces and side surfaces angularly spaced about the axis, the method comprising:

holding the fastener in a generally vertical orientation at the upper and lower end surfaces and rotating the held fastener through an angular range about its axis;

projecting a plane of light from a light source onto viewable side surfaces of the held fastener, the plane of light having a width wider than the width of the fastener to obtain left and right portions of the projected plane of light passing by and not blocked by the held fastener;

moving the plane of light in a direction parallel to the fastener axis, wherein the axis is substantially perpendicular to the plane of light;

providing a camera with at least one row of pixel elements to detect the left and right portions of the projected plane of light to obtain detected line images of left and right portions of the outer edges of the held fastener at each known linear lengthwise increment of one-dimensional linear movement and at each of a plurality of angular orientations of the held fastener and to provide corresponding electrical signals representative of left and right outer profiles of the held fastener daring the scanning process;

calibrating each incremental movement to the at least one row of pixel elements wherein a given number of rows of pixel elements is utilized to detect a line image during each increment;

receiving the electrical signals during each relative incremental movement along the length of the fastener during the scanning process;

receiving the electrical signals during rotary movement of the held fastener about the axis during the scanning process;

recording the left and right outer profiles based on the electrical signals, the recorded left and right outer profiles representing composite profiles taken at the plurality of angular orientations including a thread pattern of the fastener wherein the viewable side surfaces of the fastener Which extend completely around the fastener are inspected without a need to detect a portion of the plane of light blocked by the fastener;

assembling the composite profiles of the fastener taken at the plurality of angular orientations;

generating a virtual object;

interacting the virtual object with the composite profiles; and calculating at least one geometric measurement including thread pitch associated with threads of the fastener based on the interaction between the virtual object and the thread pattern of the assembled composite profiles;

wherein the light source and the camera define a fixed distance therebetween such that the light source and the camera are moved along a fixed one-dimensional linear path in unison along the length of the fastener during the linear scan while maintaining the fixed distance therebetween, and wherein the rotation of the fastener and fixed one-dimensional movement of the linear translator enables the fastener to be scanned during the scanning process.

32. The method of claim 31, further comprising generating a three-dimensional model of the fastener based on the assembled composite profiles.

33. The method of claim 31, further comprising generating a display of the left and right profiles of the fastener.

34. The method of claim 31, wherein the held fastener does not move along its length during a linear scan of the scanning process.

35. The method of claim 31, Wherein the camera is a line-scan camera.

36. The system as claimed in claim 1, Wherein the linear lengthwise increments are micron-sized.

37. The system as claimed in claim 9, wherein the linear lengthwise increments are micron-sized.

38. The system as claimed in claim 16, wherein the linear lengthwise increments are micron-sized.

39. The method as claimed in claim 25, wherein the linear lengthwise increments are micron-sized.

40. The method as claimed in claim 31, wherein the linear lengthwise increments are micron-sized.

41. The system as claimed in claim 1, further comprising a telecentric lens arrangement supported between the light source and the camera to form a consistent profile of the fastener regardless of light source structure.

42. The system as claimed in claim 9, further comprising a telecentric lens arrangement supported between the light source and the camera to form a consistent profile of the fastener regardless of light source structure.

43. The system as claimed in 16, further comprising a telecentric lens arrangement supported between the light source and the detector to form a consistent profile of the fastener regardless of light source structure.

44. The system as claimed in claim 1, wherein the virtual object is represents three wires and the interaction between the virtual object and the assembled composite profiles is a three-wire thread measurement.

45. The system as claimed in claim 9, wherein the virtual object is represents three wires and the interaction between the virtual object and the assembled composite profiles is a three-wire thread measurement of the thread pitch of the fastener.

46. The system as claimed in claim 16, wherein the virtual object is represents three wires and the interaction between the virtual object and the assembled composite profiles is a three-wire thread measurement.

47. The method as claimed in claim 25, wherein the virtual object is represents three wires and the interaction between the virtual object and the assembled composite profiles is a three-wire thread measurement.

48. The method as claimed in claim 31, wherein the virtual object is represents three wires and the interaction between the virtual object and the assembled composite profiles is a three-wire thread measurement.

* * * * *

UNITED STATES PATENT AND TRADEMARK OFFICE
CERTIFICATE OF CORRECTION

PATENT NO. : 10,690,487 B2
APPLICATION NO. : 12/571836
DATED : June 23, 2020
INVENTOR(S) : David Crowther et al.

Page 1 of 2

It is certified that error appears in the above-identified patent and that said Letters Patent is hereby corrected as shown below:

In the Claims

Column 7, Line 35, Claim 1:
After "and right outer profiles imaged by"
Insert -- the --.

Column 9, Line 49, Claim 16:
Delete "an LIED light source" and
Insert -- an LED light source --.

Column 9, Line 52, Claim 16:
After "onto the held fastener to obtain"
Delete "loft and right" and
Insert -- left and right --.

Column 12, Line 32, Claim 31:
After "profiles of the held fastener"
Delete "daring" and
Insert -- during --.

Column 12, Line 50, Claim 31:
After "the fastener"
Delete "Which" and
Insert -- which --.

Column 14, Lines 7-8, Claim 44:
After "the virtual object"
Delete "is".

Signed and Sealed this
Twentieth Day of October, 2020

Andrei Iancu
*Director of the United States Patent and Trademark Office*

CERTIFICATE OF CORRECTION (continued)
U.S. Pat. No. 10,690,487 B2

Column 14, Lines 11-12, Claim 45:
After "the virtual object"
Delete "is".

Column 14, Line 16-17, Claim 46:
After "the virtual object"
Delete "is".

Column 14, Lines 20-21, Claim 47:
After "the virtual object"
Delete "is".

Column 14, Lines 25-26, Claim 48:
After "the virtual object"
Delete "is".